Figure 1:
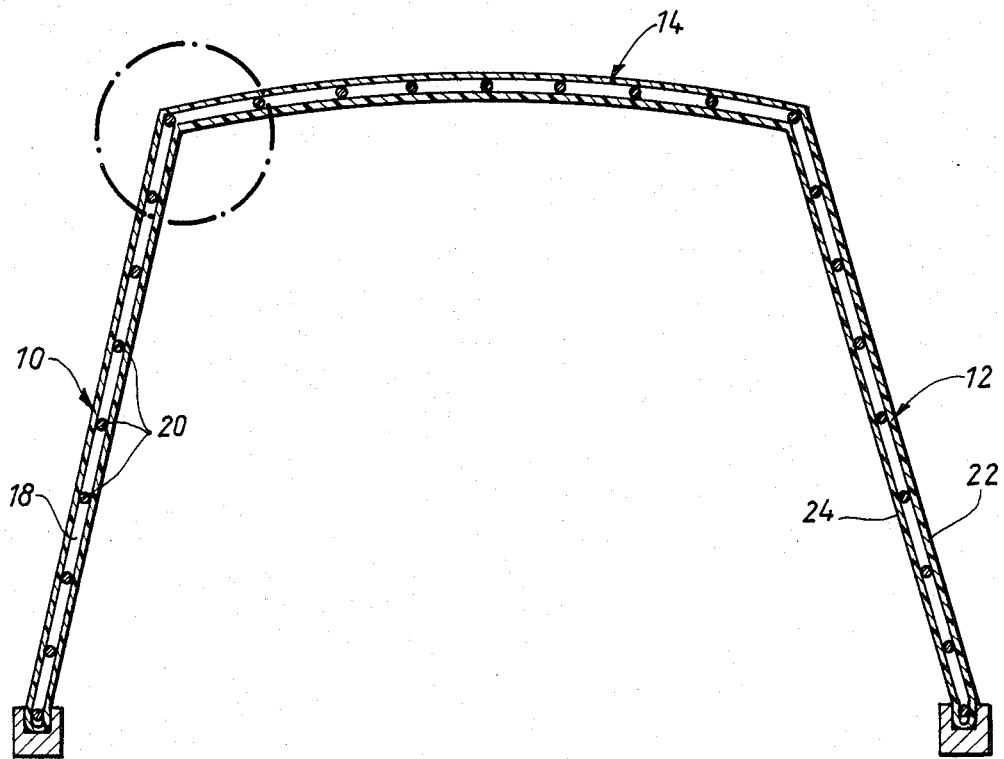

United States Patent [19]

Diethelm

[11] Patent Number: 4,525,964
[45] Date of Patent: Jul. 2, 1985

[54] STRUCTURAL ELEMENT FOR THE MANUFACTURE OF CASINGS, WALL DISKS, BOXES AND SUCH ARTICLES

[76] Inventor: Adolf Diethelm, Reussensteinstrasse 20, D-7312 Kirchheim/Teck, Fed. Rep. of Germany

[21] Appl. No.: 498,587

[22] Filed: May 26, 1983

[30] Foreign Application Priority Data

May 28, 1982 [DE] Fed. Rep. of Germany ....... 3220176

[51] Int. Cl.³ ................................................. E04C 1/00
[52] U.S. Cl. ............................. 52/309.11; 52/309.16; 52/88; 52/630; 47/66
[58] Field of Search ...................... 52/88, 309.1, 309.13, 52/309.15, 309.16, 309.9, 309.11, 630; 47/66, 68, 69, 78–82; 428/256

[56] References Cited

U.S. PATENT DOCUMENTS

| | | | |
|---|---|---|---|
| 1,224,820 | 5/1917 | Williams | 47/66 |
| 2,896,271 | 7/1959 | Kloote et al. | 52/309.9 X |
| 3,081,579 | 3/1963 | Pelley | 52/309.16 X |
| 4,083,147 | 4/1978 | Garrick | 47/80 |

FOREIGN PATENT DOCUMENTS

| | | | |
|---|---|---|---|
| 75641 | 4/1983 | European Pat. Off. | 428/256 |
| 2028395 | 3/1980 | United Kingdom | 52/309.16 |

OTHER PUBLICATIONS

"Glass-Plastic Igloo is Stronger than Steel", *Popular Science*, Nov. 1950, p. 162.
"The Dura-Plex Fiberglas/Polyurethane Sandwich Panel Building System", *Duraplex*, Jun. 1980.

*Primary Examiner*—Donald G. Kelly
*Assistant Examiner*—Naoko N. Slack
*Attorney, Agent, or Firm*—Kenyon & Kenyon

[57] ABSTRACT

The invention relates to a structural element for the manufacture of casings, wall disks, boxes and such articles comprising a shell made of thermosetting plastic and preferably reinforced to give it shape stability by reinforcement members which, more particularly, are formed by reinforcement grids composed of iron bars welded to one another and are fully enclosed by the plastic. On account of the enclosed air chambers, these structural elements have good thermal insulation properties. They are exceptionally well suited, for example, for greenhouses, plant boxes and the like.

13 Claims, 4 Drawing Figures

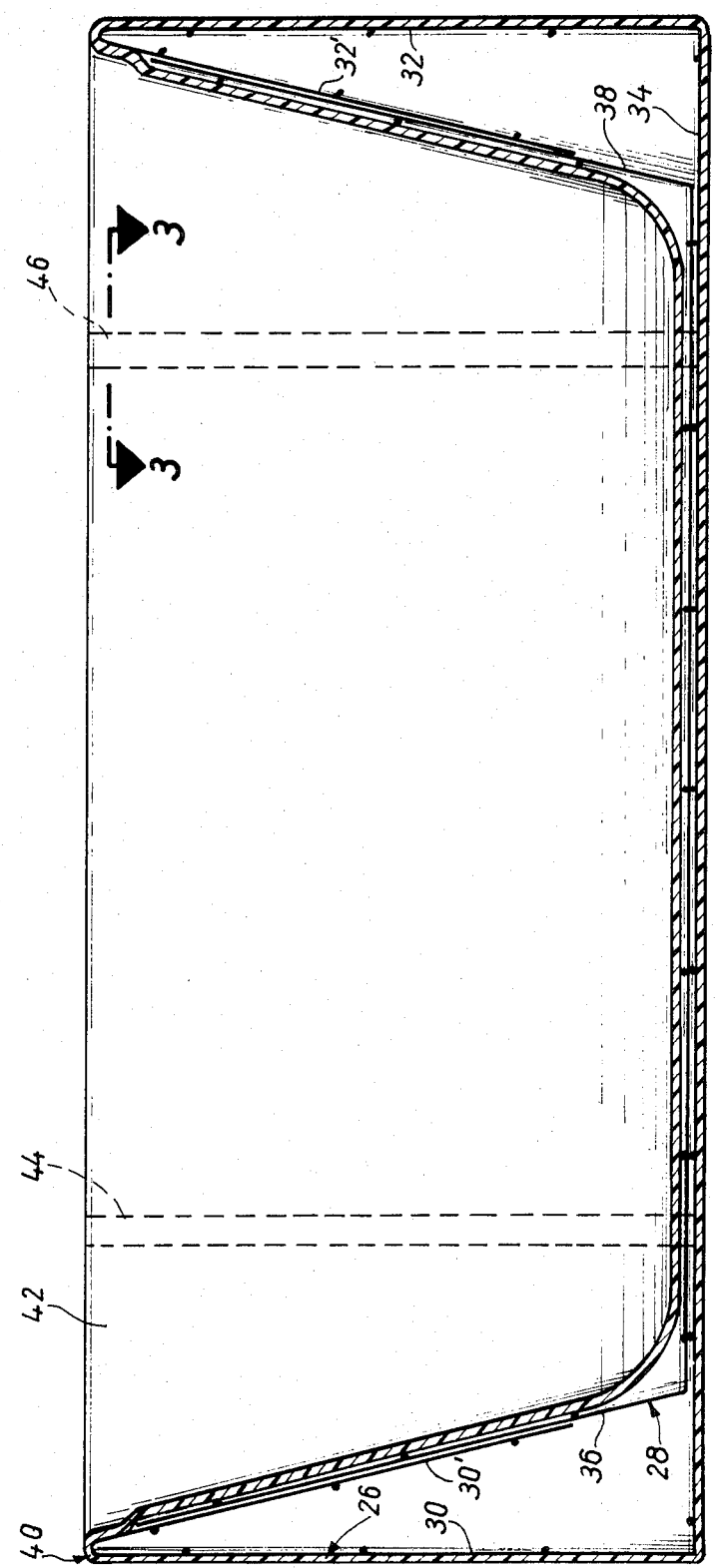

STRUCTURAL ELEMENT FOR THE MANUFACTURE OF CASINGS, WALL DISKS, BOXES AND SUCH ARTICLES

The invention relates to a structural element for the manufacture of casings, wall disks, boxes and such articles which is characterized in accordance with the invention in that it comprises a thin-walled and double-walled shell of thermosetting plastic material (shell walls 22, 24) which is of substantially stable shape and is reinforced so as to render it self-supporting.

Such a structural element is particularly well suited for the manufacture of parts which should be transparent and/or have thermal insulation properties, which is, for example, applicable to greenhouses. The plastic may also be non-transparent for many purposes.

Such parts are required, for example, in greenhouses where they are employable as structural elements in the erection of greenhouses or, for example, for plant boxes which should comprise a relatively large capacity, be resistant to deformation and exhibit good thermal insulation properties. It is expedient to provide the shell walls with glass fiber reinforcement so as to increase the breaking resistance.

The insulating properties are best obtained by the shell walls being integrally or tightly joined along their edge so that air is enclosed within the structural element, which eliminates the possibility of convection.

Since the shell-shaped structural elements are reinforced so as to be self-supporting, the shell walls can be of thin construction, i.e., have a wall thickness not exceeding approximately 2 mm. This keeps the weight of such structural elements within bounds. Such structural elements are advantageously suited for the construction of greenhouses, their own height being substantially less than that of conventional glass or plastic constructions.

Reinforcement members formed by welded together bars of at least one reinforcement grid inserted into the space between the shell walls are particularly well suited for rendering structural elements according to the invention self-supporting. The advantage of such a reinforcement grid is that its bars need only be bent to be put into any desired position, whereupon the shell walls can be mounted on the reinforcement grids. The shell walls and the reinforcement members, i.e., reinforcement grid, can be coordinated with one another such as to divide the area between the shell walls into individual air spaces or cells.

The use of a reinforcement grid for reinforcement purposes enables, for example, the manufacture of integral structural elements which when arranged in rows form the side walls and the roofing of a greenhouse. This is enabled by imparting a U-shape to the reinforcement grid so that the U-shaped legs then form the side walls and the connecting pipe joining together these side walls form the gable-roof-shaped or upwardly convexly curved roof secton. It is appropriate to provide the end edges of such structural elements intended for the erection to greenhouses with suitable connection means for establishing a firm mutual connection between such structural elements when they are arranged in rows. Such connection means can be, for example, in the form of connecting ledges of dovetailed cross-section which are adapted to be pushed into one another when the structural elements are set up. The area of the end edges which is not covered by such connecting ledges can be provided with further, more particularly, flexible, band-shaped connector members to enable a weather-proof and, if required, joint sealed mutual assembly connection.

Boxes designed according to the invention, for example, plant boxes, are also easy to construct by being able to be arranged in rows in accordance with the building-block system. The advantage of such plant boxes, compared to the conventional plant tables used, for example, hitherto in greenhouses is that the humus soil can be piled substantially higher in these than on plant tables. While the humus layer is normally deposited on the latter at a height of approximately 10 cm, it can have a minimum height of approximately 50 cm in plant boxes according to the invention. This enables much denser planting since the plant roots can push down into the depth of the humus layer.

Furthermore, in the event of, for example, fungal or other plant diseases, individual plant boxes containing infected plants can be removed from a row of plant boxes, disinfected and put back in again.

Figure 1A:
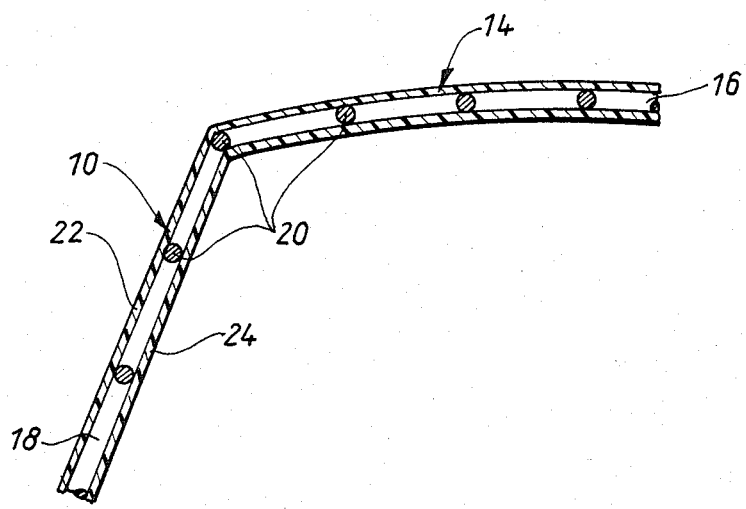

Embodiments of structural elements according to the invention are shown in the drawings, in which:

FIG. 1 is a cross section through a structural element forming a section of a greenhouse;

FIG. 1a a section of this structural element, indicated by a dot-and-dash circle in FIG. 1, on a larger scale than FIG. 1;

FIG. 2 a cross section through a plant box and

Figure 3:
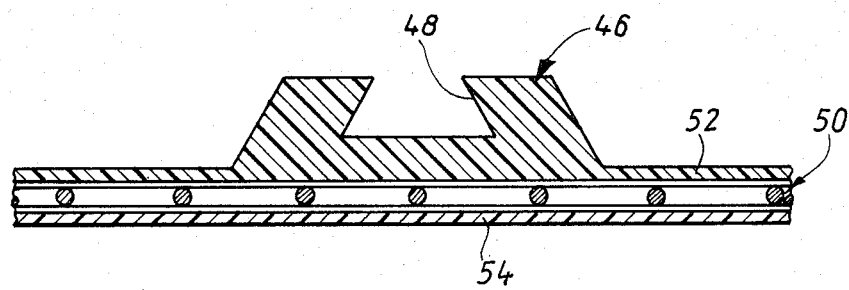

FIG. 3 a partial section along the line 3—3 of FIG. 2 on a larger scale than FIG. 2.

The structural element shown in FIG. 1 is of U-shaped cross-section and forms part of a greenhouse. The legs 10, 12 constitute a portion of the walls disks of the greenhouse and the connecting piece 14 joining together the U-shaped legs forms part of the greenhouse roof. The structural element is of self-supporting construction, which is enabled by its being provided with a reinforcement grid 16 consisting of iron bars 18, 20 which are welded together in one plane in perpendicular relation to one another. It is preferable to use reinforcement grids such as are produced as reinforcing members in concrete construction.

The reinforcement grid is embedded between two shell walls 22, 24 made of thermosetting, preferably glass fiber reinforced plastic, which are joined together along the bottom longitudinal edges of the legs 10, 12 in an integrally or materially united manner. The shell walls may have a minimum thickness of approximately 0.6 mm up to a maximum thickness of 10 mm. They can be mounted on the reinforcement grid in such a way that the latter together with the shell walls forms a plurality of square or rectangular, air-filled cells. The shell walls therefore form a plastic sheathing which exhibits good transparent properties and together with the reinforcement grid is of self-supporting and extremely stable construction with regard to shape since relative motions are practically excluded between the shell walls and the reinforcement grid.

It is obvious that the structural elements intended for the end faces of a greenhouse must be of closed construction at one of their end sides, with the respective end wall being of flat or outwardly curved configuration.

A construction wherein the wall disks and the roof section are manufactured separately and suitably joined together is also plausible. Such a construction is preferable, for example, for greenhouses with very high and very wide dimensions.

The plant box shown in FIG. 2 comprises an inside reinforcement formed, for example, by two reinforcement grids 26, 28 both of U-shaped configuration. The U-shaped legs 30, 32 extend upwardly perpendicularly to the connecting piece 34 joining them and are bent over, while the U-shaped legs 36, 38 of the inside reinforcement grid 28 extend obliquely upwardly and outwardly so as to approach with their upper edge section the U-shaped legs 30, 32 of the reinforcement grid 26. The last aforementioned U-shaped legs are bent obliquely inwardly and downwardly with a section 30' and 32', respectively, so as to extend approximately parallel to the U-shaped legs 36, 38. Both reinforcement grids are enclosed on their outside by a glass fiber reinforced sheathing 40 made of thermosetting plastic, which together with the reinforcement grids forms a deformation resistant trough with upwardly tapering side walls of wedge-shaped cross-section forming thermally insulating air chambers, and air ensuring good insulation also being present between the inside and outside bottom shell sections.

The plant box comprises end walls 42 which are similarly formed by reinforcement grids enclosed by thermosetting plastic material. On their outside, the end walls comprise, for example, two connecting ledges 44, 46 which are arranged in parallel spaced relationship to each other and are of dovetailed cross-section so as to enable plant boxes arranged in rows to be firmly anchored together. While the connecting ledges comprise a dovetailed groove 48, the connecting ledges formed on the opposite end wall constitute a dovetailed projection adapted to fit into such a dovetailed groove. Other suitable connection means may also be used. Seals in the form of rubber strips or suitable plastic members may be provided between the adjacent outside surfaces of the end walls.

In FIG. 3, the reinforcement grid of the end walls is designated by 50 and the shell walls enclosing the reinforcement grid by 52 and 54.

The plant box shown is preferably 50 cm high and 125 cm wide and may be several meters long. In a preferred embodiment, the thickness of the shell walls is approximately 1.5 mm.

The thermosetting plastic used may be transparent if employed in the construction of greenhouses. However, a non-transparent plastic material is also suitable in many cases.

Carefully performed tests with plant boxes of the kind described hereinabove have produced surprisingly favourable results. The water consumption in the plant boxes compared with planting of the same scope is approximately 30% lower. Moreover, the yield is substantially greater after only a few months, which is obviously due to the balanced climatic conditions in the plant boxes.

What is claimed is:

1. A structural element for the manufacture of casings, wall disks, boxes and such articles comprising:
   (a) a thin wall shell including;
      (i) an inner wall;
      (ii) an outer wall spaced from said inner wall, said inner and outer walls tightly joined along their edges so as to form a closed space therebetween;
      (iii) said inner and outer walls made of a thermosetting plastic material which is of substantially stable shape and is reinforced so as to render it self-supporting; and
   (b) a plurality of structural elements inserted between said inner and outer walls dividing the space between said walls into a plurality of individual cells, whereby the stable shape and reinforcement of said inner and outer walls, in combination with said reinforcement members will provide a stiff structural element of light weight and durability and said sealing of the edges of said inner and outer walls, along with the division into cells will result in a plurality of cells acting as insulators.

2. A structural element as defined in claim 1, wherein said shell walls are glass fiber reinforced.

3. A structural element as defined in claim 1, wherein said inner and outer walls are integrally joined along their edges.

4. A structural element as defined in claim 1, wherein the thickness of said inner and outer walls is approximately 2 mm.

5. A structural element as defined in claim 1, wherein said reinforcement members comprise a reinforcement grid made up of a plurality of iron bars welded together.

6. A structural element as defined in claim 5, wherein said structural element is for use in constructing a greenhouse and wherein said structural element has a U-shaped configuration with legs of the U forming side walls and a base of the U joining the side walls and forming a roof section of a gable roof shape or outwardly convexly curved configuration.

7. A structural element in the form of a box comprising:
   (a) an inner shell wall and an outer shell wall spaced therefrom, both of said shell walls made of thermosetting plastic material of substantially stable shape and reinforced so as to render it self-supporting, said inner and outer shell walls tightly joined along their edges to form a closed space therebetween, each of said shell walls having the shape of a box with first and second side walls, first and second end walls and a bottom; and
   (b) reinforcement members disposed in the space between said inner and outer shell walls comprising:
      (i) inner and outer U-shaped reinforcement grids made up of welded iron bars, each having a pair of legs and an interconnecting base portion, the inner grid disposed inside the outer grid; and
      (ii) first and second end reinforcement grids disposed at the ends of said inner and outer U-shaped grids, the base of the inner U-shaped grid resting on the base of the outer U-shaped grid, said outer U-shaped grid having legs which extend perpendicularly from its base and said inner U-shaped grid having a base narrower than that of said outer U-shaped grid and having its legs extending obliquely outwardly in the direction of the ends of the legs of said outer U-shaped grid, the sides of said inner shell wall contacting the legs of said inner grid and the bottom of said inner shell contacting the base of said inner grid, the sides of said outer shell wall contacting the legs of said outer grid and the bottom of said outside shell wall contacting the base of said outer grid, and said end reinforcement grids sandwiched between the ends of said inner and outer shell walls, respectively.

8. A structural element as defined in claim 7, wherein each of the legs of said outer reinforcement grid has, at its end, a portion which is bent inwardly and downwardly so as to extend substantially parallel to the obliquely upwardly and outwardly directed legs of said inner reinforcement grid.

9. A structural element as defined in claim 8, and further including connecting means, for mutually joining individual boxes, arranged at the end walls of said structural element.

10. A structural element as defined in claim 7, and further including connecting means, for mutually joining individual boxes, arranged at the end walls of said structural element.

11. A structural element according to claim 7, wherein said shell walls are glass fiber reinforced.

12. A structural element according to claim 7, wherein said shell walls are integrally joined along their edges.

13. A structural element according to claim 7, wherein the thickness of said shell walls is approximately 2 mm.

* * * * *

UNITED STATES PATENT AND TRADEMARK OFFICE
CERTIFICATE OF CORRECTION

PATENT NO. : 4,525,964

DATED : July 2, 1985

INVENTOR(S) : Adolf Diethelm

It is certified that error appears in the above-identified patent and that said Letters Patent is hereby corrected as shown below:

Column 1, line 56, change "pipe" to --piece--.

Column 1, line 58, change "secton" to --section--.

Column 1, line 60, change "to" to --of--.

Signed and Sealed this

Twenty-fourth Day of December 1985

[SEAL]

Attest:

DONALD J. QUIGG

Attesting Officer

Commissioner of Patents and Trademarks